United States Patent Office 3,398,531
Patented Aug. 27, 1968

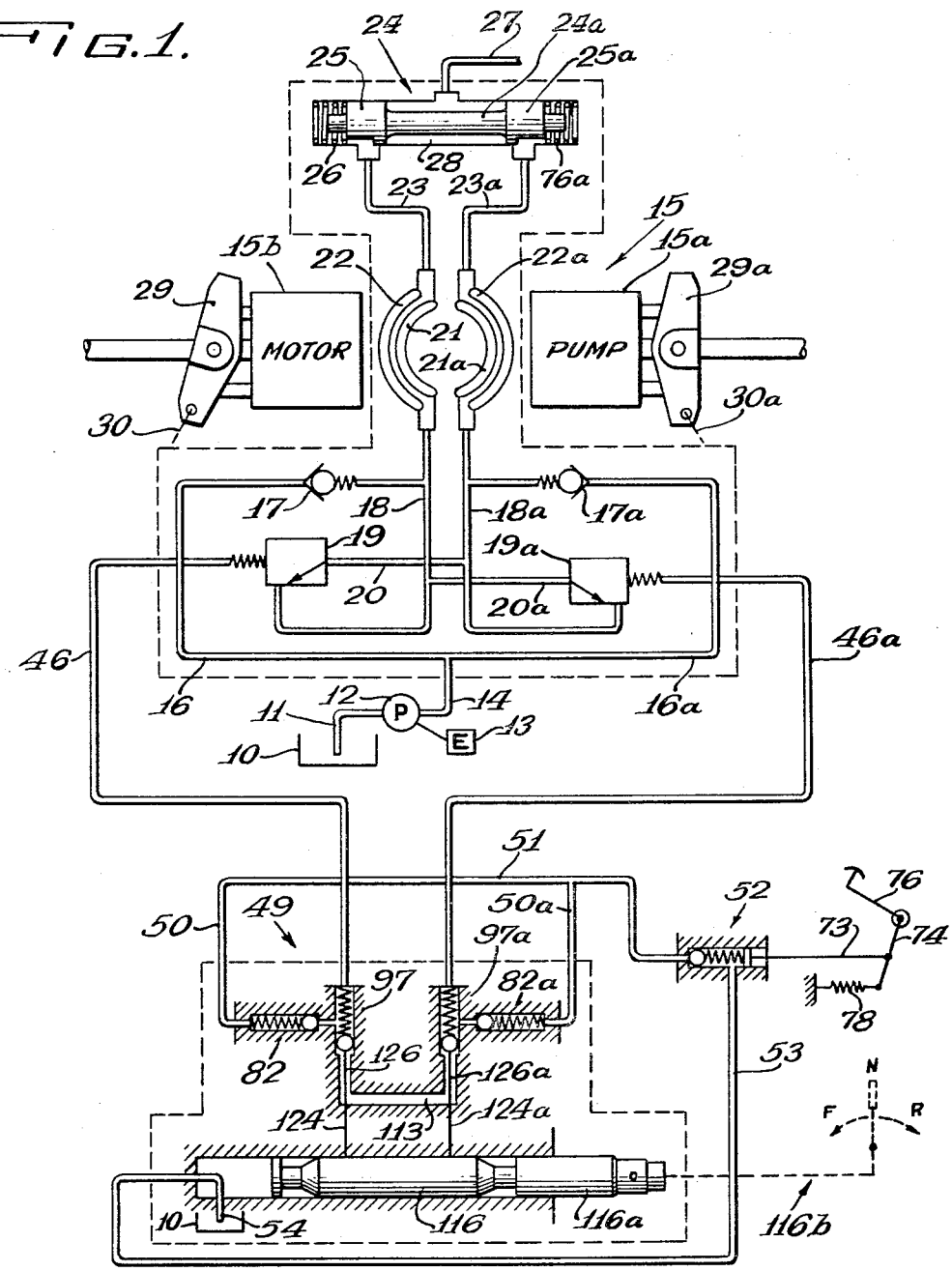

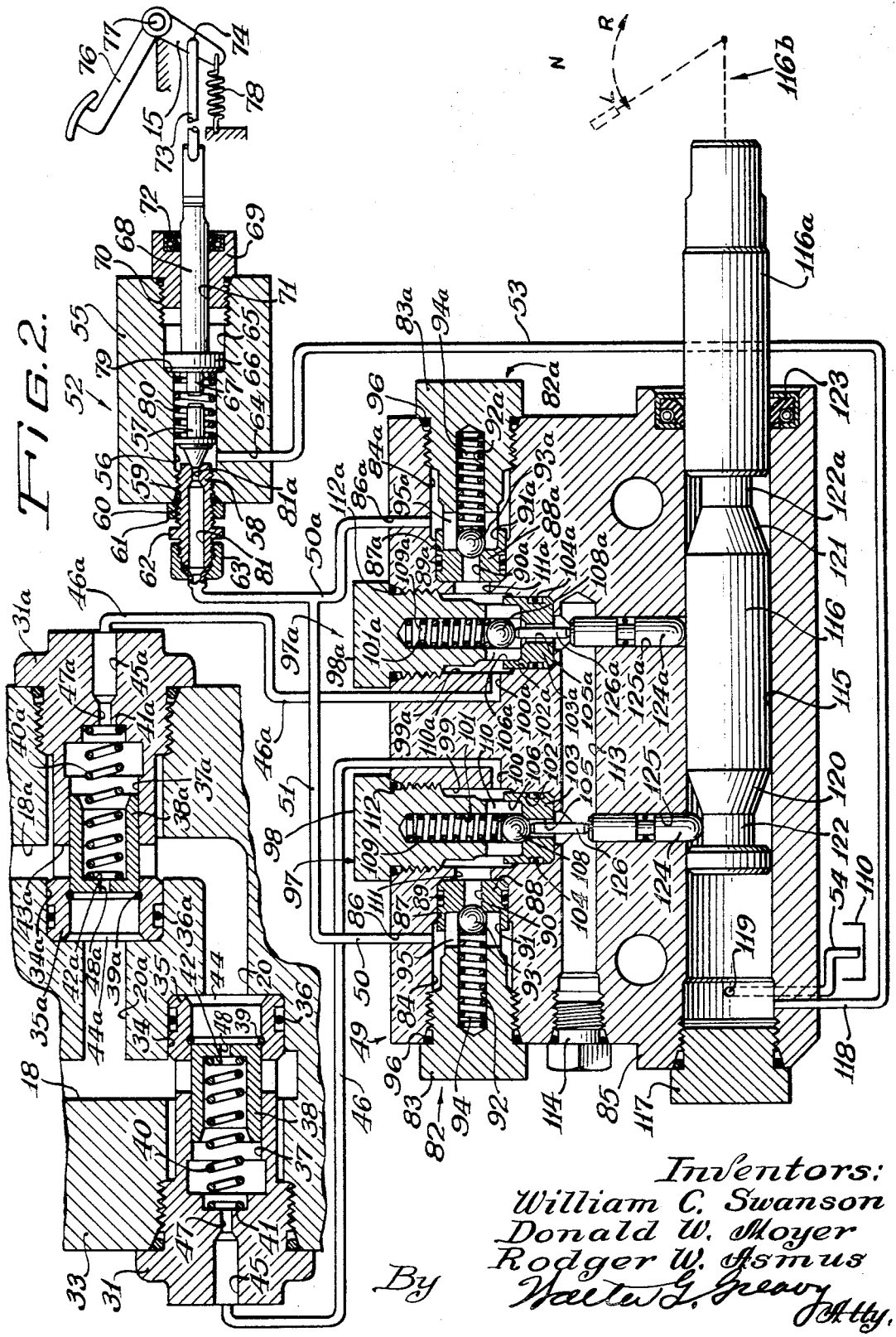

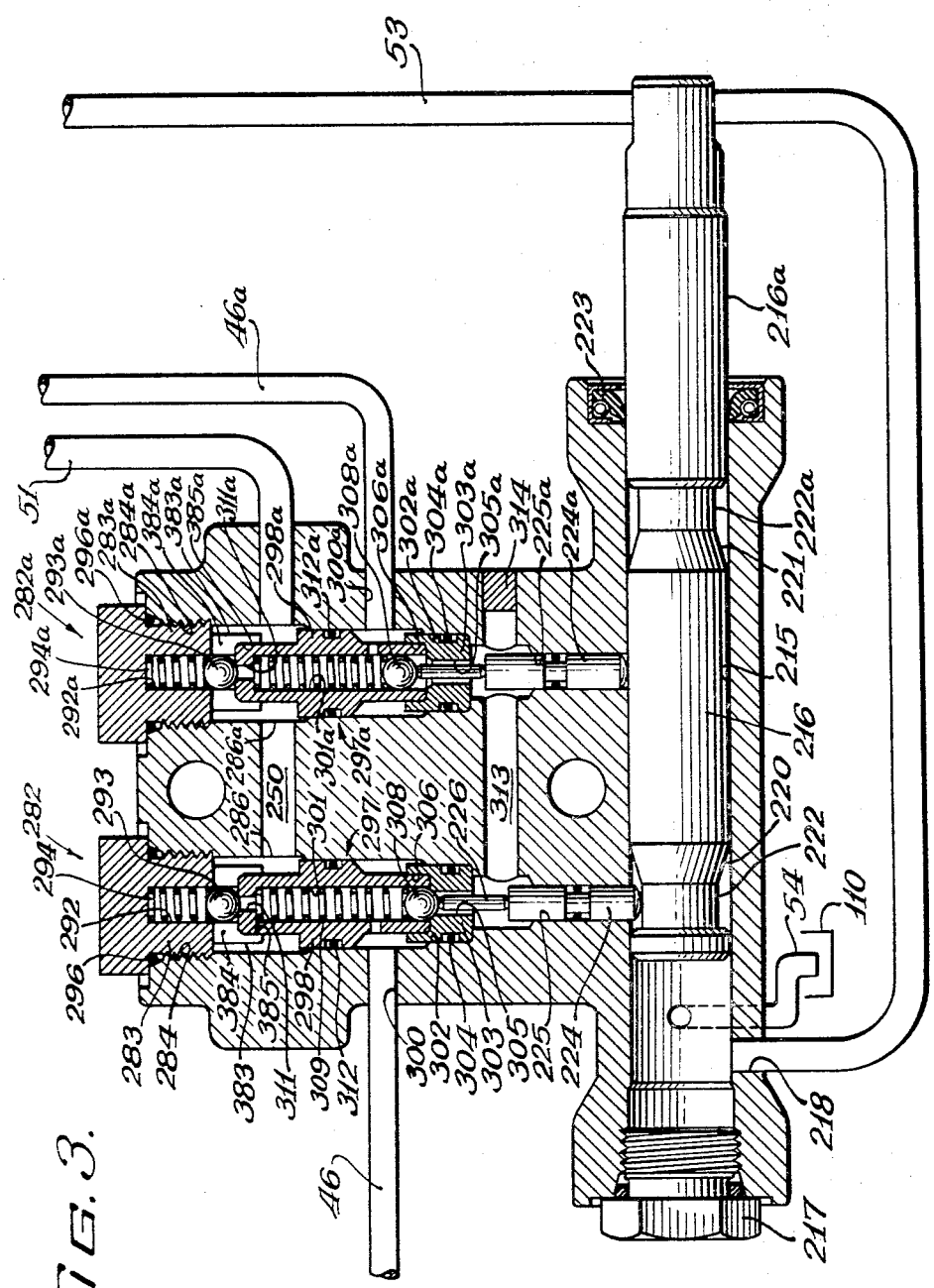

3,398,531
MECHANICAL FEATHERING CONTROL AND AUTOMATIC OVERSPEED CONTROL FOR A HYDROSTATIC TRANSMISSION
William C. Swanson, Clarendon Hills, and Donald W. Moyer and Rodger W. Asmus, Downers Grove, Ill., assignors to International Harvester Company, Chicago, Ill., a corporation of Delaware
Filed Oct. 11, 1966, Ser. No. 585,902
10 Claims. (Cl. 60—53)

ABSTRACT OF THE DISCLOSURE

An automatic overspeed control for a hydrostatic transmission having a pump and motor connected by a hydraulic circuit and including valve means for dumping hydraulic fluid under pressure to the reservoir when the flow of power through the transmission is reversed, and mechanical linkage means connected to the valve means for interrupting the flow of power through the transmission and for providing feathering control of the transmission.

---

This invention relates to hydrostatic transmissions but more particularly to control means for preventing overspeeding and additionally providing feathering control of a transmission of this type when incorporated in a vehicle.

It is well known that hydrostatic transmissions are frequently employed in the power train for transmitting drive between the engine and propulsion wheels of a vehicle. However, despite the increasing use of hydrostatic transmission in vehicles such arrangements continue to encounter drawbacks and objectionable characteristics which have not heretofore been satisfactorily resolved in applications of this character. One such difficulty is the accidental overspeeding of such transmissions when, for instance, the vehicle is pushed by the weight of the vehicle or the weight of the vehicle and any load being carried or towed by the vehicle down an incline, and the momentum is sufficient to cause the dynamic braking effect of the transmission to be overcome with the result that the motor component of the motor-pump transmission unit tends to drive the pump component thereof as well as the engine of the vehicle at speeds in excess of those for which such units are designed, and ultimately causing severe damage thereto.

Another difficulty encountered has been in providing satisfactory feathering operation for such transmissions particularly with respect to providing an inching feature in farm tractor vehicles so as to aid in the maneuvering thereof into positions for attaching implements or trailers.

It is a principal object of the present invention, therefore, to provide automatic overspeed control means for a hydrostatic transmission when the flow of power therethrough is reversed in direction from that of normal operation.

Another object is to provide in a hydrostatic transmission an overspeed control means coupled with means operable for providing feathering control of said transmission.

A further object is to provide in a hydrostatic transmission valving means selectively settable or prepositionable to positions corresponding with the reverse, neutral and forward control positions established for a hydrostatic transmission whereby upon setting said valving means for such corresponding positions said valving means are operative when the flow of power through the transmission is reversed in direction from that of normal operation to prevent an excessive build-up of pressure and a detrimental overspeeding of such hydrostatic transmission resulting from such pressure increase.

A still further object is to provide in a hydrostatic transmission valving means operable to provide a plurality of functions including, switching means to transfer the drive pilot pressure in the hydrostatic loop thereof in either the forward or reverse drive positions thereof to a single high pressure pilot relief valve, providing a hydraulic transmission neutral without having to hold a manual override in a disengaged position, and accommodating a lower pressure pilot relief valve that functions in the circuit of the hydrostatic loop to retard or eliminate drive pump and engine overspeed.

A yet still further object is to provide simplified feathering control means for a hydrostatic transmission.

An important object is to provide in a hydrostatic transmission overspeed control means the operation of which is coordinated with other control means that are operative to selectively provide the reverse, neutral and forward drive control positions of said transmission.

Another important object is to provide means for mechanical overriding of a high pressure pilot relief valve in the drive pressure side of a hydrostatic transmission.

The foregoing and other objects and features of the invention will become apparent as the disclosure is more fully made in the following detailed description of a preferred embodiment of the invention as illustrated in the accompanying sheets of drawing in which:

FIGURE 1 is a diagrammatic view illustrating mechanical and fluid circuit features of a transmission embodying the present invention;

FIGURE 2 is a generally sectional view, with portions thereof shown somewhat schematically, of the valving means employed in the hydrostatic transmission shown in the preceding view; and FIGURE 3 is a generally sectional view, with portions thereof shown somewhat schematically, of a modified embodiment of the valving assembly shown in the preceding view.

Referring now to the drawings, where there is presented a general representation of a portion of a hydrostatic transmission system of the type customarily incorporated in vehicles for propulsion thereof, it will be seen that only the components of the system pertinent to the instant invention are included. It being understood other components may also be employed without deviating from any of the inventive concepts hereof.

A fluid reservoir 10 connects by a conduit or passage 11 with the inlet of a fluid supply pump 12 which may be driven by suitable means such as the engine indicated at 13. An outlet of pump 12 opens into a conduit 14 and the latter in turn connects with an inlet of a motor-pump unit indicated generally by reference numeral 15. This portion of the system supplies the charge or make-up fluid to the motor-pump unit from pump 12 and together with the outlet circuit of said unit is commonly referred to as the charge circuit. It will be understood of course that the pump component 15 thereof will be operatively connected to suitable driving means such as the engine or motive power of an associated vehicle (not shown) while the motor component 15b will be suitably connected to other equipment, such as the drive train of a vehicle, to be driven thereby (not shown).

Since the motor-pump unit 15 is generally conventional, such, for example, as the hydraulically interconnected and back-to-back arranged motor-pump unit described in the Hann et al. U.S. Patent 3,126,707 and marketed by the Sundstrand Corp., it was felt no extensive elaboration of the details or construction thereof need be included herein. Conduit 14 connects into said motor-pump unit by way of a pair of conduits 16, 16a (FIGURE 1) which connect into respective check valves 17, 17a of conventional construction while the outlet sides of the latter valves open into the respective conduits 18, 18a which, in turn, connect at one end thereof into the respective pilot-operated high pressure relief valves 19, 19a. The outlets of said high pressure relief valves are cross-connected by conduits 20a, 20 with the respective inlets of valves 19a, 19 so as to by-pass a large flow of fluid therebetween upon opening of either one of these relief valves as a result of an excessively high pressure in the associated circuit. The opposite ends of conduits 18, 18a communicate with the kidney-shaped ports 21, 21a and 22, 22a of the respective pump and motor components of said unit, and additional conduits 23, 23a communicating with the respective kidney ports connect into opposite ends of a shuttle valve 24. Said shuttle valve, which is of conventional construction may include a piston 24a having enlarged heads 25, 25a at opposite ends thereof, and centering springs 26, 26a whereby said piston is maintained centered when the transmission is operating in its neutral position. An outlet or discharge conduit 27 communicates with a chamber 28 formed between the opposite heads 25, 25a of said valve and which chamber upon operation of said valve is adapted to communicate with a respective one of conduits 23, 23a. When either of the conduits 23, 23a is subjected to high pressure, the piston 24a will be shifted connecting the discharge conduit 27 with the other of the conduits 23, 23a which will be at low pressure. The fluid exhausted through the conduit 27 is then utilized for cooling the pump and motor mechanism as shown in the aforementioned Hann et al. patent.

It will be appreciated, of course, that valves 17, 17a and 19, 19a together with pump and motor kidney ports 21, 21a and 22, 22a and shuttle valve 24 may be fashioned as part of the motor-pump unut 15 whereupon many of the conduits designated as interconnecting these components may be constituted as fluid passages formed in the casing, housing or valve plate members rather than as separate or individual elements.

The swash plates 29, 29a of the respective motor and pump components of the unit 15 may be operatively connected for displacement, by suitable means such as indicated schematically at 30, 30a, with suitable servos and servo actuating means (not shown) for controlling the displaced positions of said plates according to well-known principles of operation of such mechanisms. For purposes of simplification of the instant application such servo displacement control means as well as other components of the transmission system not particularly pertinent to the present invention are omitted, but since they are substantially identical to the disclosure in copending U.S. patent applications Ser. No. 548,184, filed May 6, 1966, now Patent No. 3,360,934, granted Jan. 2, 1968, and Ser. No. 589,895, filed Oct. 27, 1966, and assigned to the same assignee as the present invention, reference may be had thereto for a further and more comprehensive elaboration thereof. Since the high pressure relief valves 19, 19a are identical and of conventional construction except for the remote pilot control thereof only one thereof need be described in detail with comparable elements of the second such valve being designated by the same reference character plus the suffix "a." Each such valve may include an outer sleeve-like body 31 theradably mounted in a bore 32 formed in a casing member such as 33 which may be constituted as a portion of the valve porting plate or center section of the motor-pump unit 15. Bore 32 has a reduced section portion 34 that slidably accommodates a head portion 35 on the inner end of the body 31 which head may be fitted with a fluid seal 36 to restrict flow of fluid therealong. A bore 37 in body 31 slidably receives a sleeve valve 38 which normally abuts a snap ring 39 mounted in an annular recess in bore 37, and a spring 40 compressibly disposed between an end wall 41 of body 31 and an end wall 42 of sleeve valve 38 continuously urges said sleeve valve into abutting contact with snap ring 39. A plurality of radial openings 43 in body 31 communicate with a respective one of the conduits or passages 18, 18a while the open end 44 of said body communicates with the respective one of the conduits or passages 20, 20a. An axially extending opening 45 in the closed end of body 31 communicates with a respective one of the pilot control conduits 46, 46a while a reduced section portion 47 of said opening provides a restricting orifice, and a similar restricting orifice opening 48 coaxially aligned therewith is provided in the closed end wall 42 of sleeve valve member 38.

Now in accordance with the more specific teachings of the present invention the control conduits or passages 46, 46a communicate with a valve assembly indicated generally by the reference numeral 49. Additional conduits or passages 50, 50a communicatively connected to said valve assembly open into a conduit or passage 51 which, in turn, connects with a feathering-relief valve 52 the outlet of which connects into a conduit 53 that opens into valve assembly 49 and by way of an outlet conduit or passage 54 discharges or dumps into reservoir 10.

The high pressure pilot and mechanically overridably controlled feathering and relief valve unit 52 may include an outer casing or body member 55 having a central bore 56 therethrough which slidably receives a pilot poppet element 57, and an adjustable seat element 58 which is threadably secured by suitable thread means such as 59 in said bore. Additional thread means 60 cooperate with a lock nut 61 whereby said adjustable seat element may be securely fixed in any one of a plurality of positions in the casing 55 in order to compensate for manufacturing deviations. A hexagonal projection 62 on seat element 58 may be provided to facilitate movement of said adjustable seat element while a threaded coupling 63 is provided to couple the conduit 51 to the valve unit 52. An outlet opening 64 communicates with the interior of bore 56 and is connected by suitable conventional means with the conduit 53.

One end of bore 56 is fashioned with an enlarged bore portion 65 that slidably accommodates a plunger-like stop member 66 having a spring guide pin or stud 67 extending from one face thereof and a rod or stem 68 extending from an opposite face of said stop. A stop guide 69 threadably mounted as by the threads 70 in the enlarged bore portion 65 has an axial opening 71 that slidably accommodates the rod or stem 68 therein. A fluid seal 72 may be provided for well-known purposes in the end of stop guide 69. Pivotally coupled to stem 68 is a push-pull rod 73 the opposite end of which is pivotally connected at 74 to an arm 75 of a foot pedal member 76 pivotally mounted at 77 by suitable means to a fixed support such as a portion of an associated vehicle (not shown). A return spring 78 interconnects the arm 75 also to the fixed support and as disposed constantly urges the pedal 76 to an up position and the stop 66 into engagement with the end wall 79 of enlarged bore portion 65. A spring 80 disposed between the poppet 57 and stop 66 normally urges said poppet into a position against the seat element 58 to restrict fluid flow therethrough. It will be noted a small axially extending space is provided between the ends of the poppet stem and the spring guide stem so as to permit limited movement of the poppet without displacing the spring stop 66.

An axial opening 81 in seat element 58 has a reduced section portion 81a therein that provides a restricting orifice for purposes which will presently be understood.

It will be seen that as pedal 76 is depressed spring stop 66 is displaced thereby relieving the compressive reaction of spring 80 and permitting the fluid pressure in 81a to force poppet 57 off its seat and dump fluid into the reservoir 10 by way of conduit 53.

In the valve assembly 49 there are two identical check valves and two identical low pressure relief valves all of which, preferably, are of the cartridge type and generally similar to one another, hence a description of one of each of these sets of valves should be sufficient to provide a clear understanding of the construction of all thereof. Since the two check valves 82, 82a are identical only one thereof need be described with comparable elements of the second such valve being designated by the same reference character plus the suffix "a." Each such valve may include a plug-like member 83 threadably mounted in a bore 84 in a casing or body 85 which may be separately constituted or fashioned as a portion of the motor-pump unit 15 without deviating from any of the teachings of the present invention. A port 86 opening into bore 84 connects with the conduit 50 and a reduced section portion 87 of bore 84 receives a seat element 88 which has a fluid sealing ring 89 thereon, a central axially extending aperture 90 therethrough and a recess 91 extending axially inwardly from one end thereof. A bore 92 in plug 83 slidably accommodates a ball element 93 which is normally held pressed against said seat element by means of a spring 94. A pair of diametrally disposed slotted openings 95 in plug 83 normally communicate the interior of bore 92 with port opening 86. Fluid sealing rings 96 may be provided for purposes which are well understood.

Inasmuch as the two low-pressure relief valves 97, 97a are also identical only one thereof need be described with corresponding elements of the second one thereof being designated by the same reference character plus the suffix "a." Each such valve may include a plug-like member 98 threadably mounted in a bore 99 in body 85 while a port opening 100 in casing 85 opens into bore 99 and into a bore 101 in said plug and connects with conduit 46. A reduced section portion 102 of bore 99 receives a seat element 103 having a fluid sealing ring 104 thereon and a central axially extending aperture 105 therethrough while a recess 106 extends axially inwardly from end of said seat element. The bore 101 in plug 98 slidably accommodates a ball element 108 which is normally held pressed against said seat element by means of a spring 109 disposed in bore 101. A pair of diametrally disposed slotted openings 110 in plug 98 normally communicate the interior of bore 101 with a port opening 111 in body 85 which opens into the interior of the adjoining check valve 82. Fluid sealing rings 112 may be provided for well-known purposes.

The body or casing 85 of valve assembly 49 has a passage 113 inwardly extending from one end thereof that communicatively interconnects low-pressure relief valve 97, 97a while the outer end of said passage is suitably covered by a threaded closure plug such as 114. A bore 115 extending through said body slidably receives a spool member 116 which has an end portion 116a that extends outwardly from one end of said bore and is suitably connected to the speed and direction of movement control means indicated in schematic fashion at 116b, the opposite end of said bore being covered by a threaded closure plug 117. The speed and direction of movement control means 116b, is preferably, of the type disclosed in the copending U.S. application Ser. No. 345,002, filed Feb. 14, 1964, now Patent No. 3,316,773, granted on May 2, 1967, assigned to the same assignee as the present invention, hence further details thereof are omitted from the instant case. Suffice it to say that said means is so correlated that with the latter means disposed in neutral the spool 116, of valve assembly 49, by virtue of an operable engagement with said means as discussed in the forementioned application, is shiftable by actuation of said means into corresponding forward, neutral and reverse positions of operation. For instance, when the associated speed and direction of movement control means is moved into a neutral position the spool 116 is likewise moved into a neutral position, and when said control means is moved from a neutral to a forward operating position the spool 116 will likewise be moved into a position that will permit valve assembly 49 to perform the selected functions thereof with the transmission conditioned for forward movement of the vehicle, and in similar manner for reverse when said control means is moved from its neutral in an opposite direction to condition the transmission for reverse movement of the vehicle. An aperture 118 in casing 85 in the vicinity of closure plug 117 connects to conduit 53 and opens into the interior of bore 115 to permit lubrication of said valve spool, while a port opening 119 in body 85 communicates the reservoir connected conduit 54 with the interior of bore 115. Spool 116 is fashioned with a pair of conical or inclined surfaces 120, 121 axially spaced therealong which flare outwardly from reduced section portions 122, 122a of spool 116, while suitable fluid seal means such as 123 may be provided to limit fluid leakage along said spool. Lift pins 124, 124a slidably disposed in bores 125, 125a and adapted to contact the respective reduced spool section portions 122, 122a and inclined surfaces 120, 121 at one end while the opposite ends of said lift pins engage valve actuating pins 126, 126a extending through seat elements 103, 103a to move the respective ball elements 108, 108a off their seats.

The springs 109, 109a are designed to allow pressure build-up in chamber 113 great enough to allow the drive pump 15a of motor-pump unit 15 to drive the engine to a maximum amount of dynamic braking without detrimental overspeed to either the engine or the drive pump. The springs 94, 94a are of low load and low rate and are used to positively return ball elements 93, 93a to their respective seated positions.

In FIGURE 3 there is illustrated a modified form of the valve assembly 49 wherein like elements have been referenced with the same reference numerals plus the number 200. Valve assembly 249 includes two identical check valves and two identical low pressure relief valves. Since the two check valves 282, 282a are identical as are also the low pressure valves 297, 297a only one of each set need be described with comparable elements of the second such valve being designated by the same reference character plus the suffix "a." Each such check valve may include a plug-like member 283 threadably mounted in a bore 284 in the casing or body 285 separately fashioned or constituted as a portion of motor-pump unit 15. A port opening 286 opening into bore 284 connects with conduit or passage 250. A reduced section extension 383 of plug-like member 283 has a transverse aperture 384 extending therethrough, a recess 385 extending inwardly from one end thereof and a reduced section or bore portion 292 extending axially inwardly from said recess. Bore 292 slidably accommodates a ball element 293 which is urged outwardly therefrom by a spring 294. A fluid sealing ring 296 may be provided for well-known purposes at the end of bore 284.

Each low pressure valve 297 includes a plunger-like member 298 disposed in bore 284 while a port opening 300 in casing 285 opens into bore 284 and connects with conduit 46. A reduced section portion 302 of bore 284 receives a seat element 303 having a fluid sealing ring 304 thereon and a central axially extending aperture 305 therethrough while a recess 306 extends axially inwardly from the end of said seat element. A bore 301 in plunger 298 slidably accommodates a ball element 308 which is normally held pressed against seat element 303 by a spring 309 disposed in said bore. An opening 311 in one end of plunger 298 communicates the interior of bore 301 with transverse slot 384. Fluid sealing rings 312 may be provided for well-known purposes. The casing 285 has a passage 313 extending from one end thereof that communicatively interconnects low-pressure relief valves 297 and 297a, while the outer end thereof is suitably covered by a closure plug 314. A bore 215 extending through said body or casing slidably receives a spool member 216 which has an end portion 216a that extends outwardly from one end of said bore and is suitably connected to the speed and direction of movement control means 116b, the opposite end of said bore being closed by threaded closure plug 217. An aperture 218 in casing 285 in the vicinity of closure plug 217 connects to conduit 53 and opens into the interior of bore 215 to permit lubrication of said valve spool, while a port opening 219 in casing or body 285 communicates the reservoir connected conduit 54 with the interior of bore 215. Spool 216 is fashioned with a pair of conical or inclined surfaces 220, 221 axially spaced therealong which flare outwardly from reduced section portions 222, 222a of spool 216, while suitable fluid seal means such as 223 may be provided to limit fluid leakage along said spool. Lift pins 224, 224a slidably disposed in bores 225, 225a and adapted to contact the respective reduced spool sections 222, 222a and inclined surfaces 220, 221 at one end while the opposite ends of said lift pins engage valve actuating pins 226, 226a extending through seat elements 303, 303a to move the respective ball elements 308, 308a off their seats according to the displaced position of spool 216.

*Operation*

The supply pump 14 provides a charge fluid at a low pressure by way of conduit 14 to the motor-pump unit 15, and with said unit operating, the motor thereof being driven by fluid under pressure from the unit's drive pump, fluid is circulated around the transmission loop interconnecting said motor and drive pump of the unit. Under this condition the fluid in the high pressure side of this loop becomes effective for actuating shuttle valve 23, moving it away from its normally centered position with the transmission in neutral, and moving it to the right or left depending on the tilted or displaced position of the swash plates in the motor-pump unit, while concomitant therewith the low pressure or return side of said transmission loop operating at a lower pressure becomes effective to permit opening of the corresponding one of the check valves 17 or 17a to admit make-up or charge fluid from the respective one of the supply lines 16, 16a. With shuttle valve 23 open conduit 27 serves to transfer fluid discharged thereinto from the motor-pump unit to other parts of the system for cooling and return to the fluid source, all of the above is, of course, the well-known manner of operation for systems of this character. It will be understood that the tilt or displacement of the swash plates to provide forward, neutral or reverse positions of the transmission will be effected responsive to actuation of the speed and direction of movement control means 116b.

Assume, initially, a neutral position whereupon the sped and direction of movement control means 116b will be in neutral and the valve spool 116 will be centered in its neutral position, as illustrated in FIGURE 1. This being the case the lift-valve pins 124–126 and 124a–126a will have been moved upwardly to unseat the respective low pressure relief valves 97, 97a thus permitting charge fluid from supply pump 14 to circulate by way of conduits 16, 16a, check valves 17, 17a, conduits 18, 18a valves 19, 19a and conduits 46, 46a through said low pressure relief valves and passage 113, and by way of check valev 82 into conduits 50 and 51 to valve 52. In this instance since the pressure in conduit 51 is not sufficient to overcome spring 80 in the feathering valve 52 or the pedal return spring 78 the latter valve will remain closed. Under this condition since the open valves 97, 97a allow a short circuit of the hydrostatic loop, only that pressure build-up therein which results from the flow restriction of the main relief valve spool 19, 19a will be allowed.

Next, assume a forward drive position, such as illustrated in FIGURE 2 of the drawings, whereupon speed and direction of movement control means 116b will be moved to a forward position and spool 116 will have been slidably displaced axially rightwardly (as viewed herein) to permit lift-valve pin 124–126 to drop into engagement with reduced spool section 122 thereby seating ball 108 on its seat element 103 and restricting flow through the low pressure valve 97 into passage 113. Since lift-valve pin 124a–126a remains in engagement with the full diameter surface of spool 116 low pressure valve 97a remains open and in communication with the charge fluid pressure in conduit 46a. In this direction of movement position kidney ports 21a, 22a will be subjected to drive fluid pressure while kidney ports 21, 22 will be subjected to charge fluid pressure. Drive fluid pressure is then carried past high pressure relief valve 19a and by way of passage 20 into high pressure relief valve 19 where a pilot flow is permitted through the latter valve by way of orifice openings 48 and 47 and passage 45 into conduit 46 and low pressure relief valve 97. This pilot pressure then aids spring 109 in retaining ball 108 seated and, by way of port opening 110 and aperture 90, displacing ball element 93 off its seat 88 in check valve 82, whereupon said pilot pressure is transmitted by way of conduit 51 into the feathering valve 52. Since this pilot pressure ordinarily is not sufficient to unseat poppet 57 thereof the latter valve will remain closed thus permitting pilot pressure to be maintained in the system.

With the direction of movement control element 116b disposed to provide reverse operation of the transmission spool 116 will be axially disposed leftwardly, as viewed herein, whereupon valve 97a will be opened and valve 97 closed. Kidney ports 21, 22 will then be subjected to drive fluid pressure while kidney ports 21a, 22a will be subjected to charge fluid pressure and valve 97a will be under pilot fluid pressure by way of conduit 46a with valve 97 being subjected to charge fluid pressure. The pilot fluid pressure in valve 97a will unseat ball 93a in check valve 83a and the feathering valve 52 then being subjected only to the pilot fluid pressure the pilot poppet 57 will remain closed and the latter pressure maintained in the system.

When the vehicle is coasting down an incline or is being push loaded by a tractor or a wagon, and with the control element 116b disposed to provide forward operation of the transmission, the drive fluid pressure is switched from conduit 46 to conduit 46a because the drive motor 15a, of motor-pump unit 15, becomes the pumping element and the hydraulic drive pump 15a becomes the motoring element. As the motoring pressure, i.e., that being produced by motor 15b acting as a pump, builds up in kidney ports 22–21 the torque output of the drive pump 15a, acting as a motor, increases and tends to overspeed or overdrive the engine or vehicle power plant to a point of damaging both said drive pump and engine. However, since the low pressure relief valve 97 is preselected to have an unloading value that limits the pressure input to the drive pump 15a during motoring conditions, the torque output may be controlled and limited. This is accomplished in the following manner. Motoring fluid pressure is transferred from kidney ports 22–21 through the orifice 48a of high pressure relief valve 19a to conduit 46a and the already open low pressure relief valve 97a through which it passes into passage 113, whereupon said pressure acts on low pressure relief valve 97 to unseat the ball 108 thereof and opening said valve to thereby short circuit or by-pass a portion of the fluid flow between opposite sides of the hydrostatic loop. This short circuiting or by-passing flow causes a pressure drop across orifice 48a which creates a greater pressure on the upstream side of the sleeve valve 38 causing it to shift and thereby open or unload the main relief valve 19a which then by-passes the larger portion of the fluid flow thereby limiting overspeeding while still maintaining a condition wherein dynamic braking may be effectively utilized.

It will be appreciated that a simlar sequence of events will be repeated when the transmission is conditioned for reverse movement by placing the speed and direction of movement control means in its reverse drive position.

The high pressure, pilot and mechanically overridable feathering and relief valve unit 52 provides feathering action during normal driving operation that is somewhat comparable to a clutch in that it permits the gradual opening and closing of the pressure side of the hydrostatic loop by selectively depressing and releasing pedal 76. This dumping-type action permits disrupting the power flow from the hydraulic drive pump to the hydraulic drive motor in the hydrostatic loop which thereby removes driving torque from the wheels of the vehicle and eliminates dynamic braking. A similar feathering action may be automatically operative during normal driving operation upon development of excess pressure in the hydrostatic loop when such pressure becomes sufficiently high to open pilot poppet 57 against the reaction of spring 80 to dump fluid by way of conduit 53 to reservoir 10 without actuation of the pedal 76 then upon release of the abnormal pressure the circuit returns to normal. On the other hand in event of a panic situation the pedal 76 may be rapidly depressed to quickly dump fluid to the reservoir to prevent excessive pressure build-up, thus providing a mechanical override for a high-pressure pilot valve for the drive pressure side of a hydrostatic transmission, thus constituting a safety feature for the device. The pedal 76 when depressed may also provide an additional neutral position for the transmission, because when so depressed there can be no pressure build-up in the hydrostatic loop such as is necessary to effect a transmission of power through the motor-pump unit. In any event, whenever the pilot poppet 57 is unseated, a flow is established through one of the orifices 48, 48a to the reservoir which causes a pressure drop to shift the associated sleeve valve 38, 38a and thereby provide a high volume short circuiting of the hydrostatic loop.

Since the operation of the modified version of the valve device shown in FIGURE 3 is identical to that of the preferred embodiment shown in FIGURE 2 repetition of the operational sequence thereof is believed unnecessary.

It will be evident from the above that the proposed invention by providing an arrangement for presetting a pair of low pressure valves, remote from the high pressure valves of the system, with mechanically actuated means the operation of which is coordinated with the speed and direction of movement control means for selectively setting said low pressure valves into forward, neutral and reverse drive positions which are thereupon operable to limit overspeeding, and further having the latter valves communicatively connectable to a high pressure relief valve for dumping to a reservoir source of fluid wherein the high pressure valve may also be manually or pedal-operated to provide feathering action, offers highly advantageous features which are readily adaptable for application to a hydrostatic transmission incorporated in a vehicle.

While certain representative embodiments and details have been shown for the purpose of illustrating the invention, it will be apparent to those skilled in the art that various changes and modifications may be made therein without departing from the spirit or scope of the invention.

What is claimed is:

1. In a hydrostatic transmission system having a variable displacement pump and a variable displacement motor hydraulically interconnected to form a closed circuit unit for transmitting power therethrough, a reservoir source of fluid, and speed and direction of movement control means connected to said unit and movable in opposite directions from a neutral center position for controlling displacement of said pump and motor unit to selectively produce forward and reverse direction of drive of said motor when the power flow is from the pump to the motor of said unit, means to limit overspeeding of said transmission when the direction of the power flow through said unit is reversed, including a pair of high pressure pilot operated relief valves communicatively connected across said closed circuit and normally closed to fluid flow between opposite sides of said closed circuit but each of which is operable responsive to development of an excessive pressure therein for short-circuiting fluid flow between opposite sides of said circuit, low pressure valve means, high pressure pilot valve means, said low pressure valve means and high pressure pilot valve means being connected in series and communicatively interposed between said high pressure valves and said reservoir, valve positioning means connected with and operative responsive to movement of said speed and direction of movement control means for prepositioning said low pressure valve means into positions corresponding to the said positions of said movement control means, said low pressure valve means being operatively responsive when the said direction of power flow through the transmission is reversed to an increase of fluid pressure in said closed circuit for short-circuiting a portion of the fluid flow therein between opposite sides of said closed circuit and concomitant therewith opening at least one of the said high pressure pilot operated valves to effect a short-circuiting of the remainder of the fluid flow in said closed circuit between opposite sides thereof to disrupt the flow of power through said unit.

2. The invention according to claim 1 but further characterized in that said low pressure valve means includes a pair of low pressure relief valves disposed in side-by-side relation and prepositionable by said valve positioning means into a plurality of positions including a neutral position wherein both the said valves are open, another position corresponding to the forward direction of drive position of the said motor wherein one of the said valves is opened and the other thereof closed, and a further position corresponding to the reverse direction of drive position of the said motor wherein the said other one of the said valves is open while the said one of the said valves is closed.

3. The invention according to claim 2 but further characterized in that said low pressure valve means additionally includes a pair of check valves one each of which is communicatively interposed between a respective one of said low pressure relief valves and the said high pressure pilot valve means.

4. The invention according to claim 1 but further characterized in that said high pressure pilot valve means includes a pilot poppet element and resilient means normally biasing said poppet to a closed position, and overriding means operable upon application of a controlled external force to permit the opening of said poppet to thereby release fluid pressure from said closed circuit to said reservoir and limit power flow when the power flow is from the pump to the motor of said unit.

5. The invention according to claim 4 but further characterized in that said overriding means includes a foot pedal pivotally mounted and arranged so that upon depressing said pedal said pilot poppet element is unseated to permit fluid flow therethrough, and resilient means normally biasing said pedal to a raised position.

6. The invention according to claim 3 and further characterized in that the said check valves are disposed at right angles to the respectively associated low pressure relief valves.

7. The invention according to claim 4 and further characterized in that said low pressure valve means, said high pressure pilot valve means and said valve positioning means are disposed remote from said high pressure pilot operated relief valves, and in that the later valves are fashioned to provide pilot pressure passages therein with said low pressure valve means being connected thereinto by conduits opening into the respective pilot pressure passages thereof.

8. The invention according to calim 1 but further characterized in that said high pressure pilot valve means includes a body having a bore therein and a valve seat in one end of said bore and mounted for adjusement along the longitudinal axis of said bore, a pilot poppet element slidably disposed in said bore, stop means slidably disposed in said bore proximate one end thereof, means normally biasing said stop means inwardly from the end of said bore, and high rate spring means disposed in said bore between said stop and said poppet element normally biasing said poppet element to a seated position on said valve seat.

9. The invention according to claim 3 but further characterized in that the check valves are disposed in coaxial alignment with and closely adjacent to the respectively associated side-by-side low pressure relief valves.

10. In a hydrostatic transmission system having a variable displacement pump and a variable displacement motor hydraulically interconnected to form a closed circuit unit for transmitting power therethrough, a reservoir source of fluid, and speed and direction of movement control means connected to said unit and movable in opposite directions from a neutral center position for controlling displacement of said pump and motor unit to selectively produce forward and reverse direction of drive of said motor when the power flow is from the pump to the motor of said unit, the combination therewith, comprising: a pair of high pressure pilot operated relief valves communicatively connected across opposite sides of said closed circuit and normally closed to fluid flow between opposite sides of said closed circuit but each of which said valves is operable responsive to development of an excessive pressure therein for shortcircuiting fluid flow between opposite sides of said closed circuit, said high pressure valves being fashioned to provide pilot pressure passages therein open to fluid pressures in opposite sides of said closed circuit, low pressure valve means, high pressure pilot valve means, fluid passage means connecting said low pressure valve means and high pressure pilot means together and connecting said latter means to said reservoir source of fluid, fluid passage means connecting said low pressure valve means into said pilot pressure passages whereby said low pressure valve means are selectively subjectable to pilot pressures from opposite sides of said closed circuit, valve settable means connected with and operative responsive to movement of said speed and direction of movement control means for presetting said low pressure valve means into positions corresponding to the said poistions of said movement control means, said low pressure valve means being normally closed to the flow of pilot pressure therethrough between opposite sides of said closed circuit when power flow is from the pump to the motor of said unit but being operatively responsive when the power flow is from the motor to the pump of said unit to an increase of pilot pressure for short-circuiting a portion of the fluid flow therein between opposite sides of said closed circuit and incident thereto opening a corresponding one of said high pressure pilot operated valves to effect a shortcircuiting of the remainder of the fluid flow in said closed circuit between opposite sides thereof whereby the flow of power through said units is disrupted.

References Cited
UNITED STATES PATENTS 3,126,707   3/1964   Hann et al. _____ 60—53
3,247,919   4/1966   Moon _____ 60—53 XR EDGAR W. GEOGHEGAN, *Primary Examiner.*